United States Patent
Hawkins

[11] 3,897,085
[45] July 29, 1975

[54] VEHICLE TOWING ASSEMBLY
[76] Inventor: Roy E. Hawkins, 6905 Falls of Neuse Rd., Raleigh, N.C.
[22] Filed: Oct. 22, 1974
[21] Appl. No.: 516,979

[52] U.S. Cl. ............. 280/402; 280/491 E; 280/503
[51] Int. Cl.[2] ........................................ B62D 53/04
[58] Field of Search ............ 280/402, 491 E, 491 R, 280/503; 214/86 A

[56] References Cited
UNITED STATES PATENTS

| | | | |
|---|---|---|---|
| 1,860,518 | 5/1932 | Wells | 280/402 |
| 1,864,781 | 6/1932 | Nutt | 280/402 |
| 3,501,169 | 3/1970 | Nutt | 280/491 E |
| 3,510,146 | 5/1970 | Hartmann | 280/491 E |
| 3,664,687 | 5/1972 | Nutt et al. | 280/402 X |
| 3,737,177 | 6/1973 | Gal | 280/491 E X |
| 3,758,135 | 9/1973 | Kniff | 280/402 |
| 3,831,980 | 8/1974 | Kniff | 280/402 |

Primary Examiner—Leo Friaglia
Attorney, Agent, or Firm—Mills and Coats

[57] ABSTRACT

A vehicle towing assembly adapted to interconnect two vehicles in a close towing relationship to each other, the two vehicles being referred to as a front towing vehicle and rear towed vehicle. The vehicle towing assembly comprises an elongated tongue adapted to attach to the rear of the towing vehicle where the tongue projects rearwardly therefrom and is detachably mounted about the rear portion thereof to an A-frame vehicle support structure. Provided as a part of the A-frame vehicle support structure is a pair of laterally spaced rearwardly projecting legs that extend underneath the front portion of the towed vehicle, and about the rear terminal end of each leg is provided an elongated cylindrical pin adapted to be received by an opening formed in a bracket fixed to the bottom structure or frame of the towed vehicle and depending downwardly therefrom. In addition, intermediately disposed between the front and rear portions of the A-frame support structure is an axle cradle structure for receiving the front axle of the towed vehicle and supporting the same in an elevated position over the surface being traversed by the two vehicles. Finally, fixed to the front terminal ends of the legs of the A-frame support structure and extending transversely across is a bumper attaching plate that is adapted to attach to the front bumper of the vehicle being towed.

10 Claims, 4 Drawing Figures

VEHICLE TOWING ASSEMBLY

The present invention relates to vehicle towing devices, and more particularly to vehicle towing devices of the type adapted to tow a trailing vehicle with the front portion thereof being supported in an elevated position relative to the surface being traversed.

BACKGROUND OF THE INVENTION

Towing devices are well known in the art and have long been used to interconnect two vehicles in back-to-front relationship wherein the front or towing vehicle pulls a rear or towed vehicle. By reviewing the following U.S. Pat., one will appreciate some of the various types and designs of vehicle towing assemblies of the prior art: U.S. Pat. No. 1,851,349; U.S. Pat. No. 3,627,154; U.S. Pat. No. 3,690,482; and U.S. Pat. No. 3,758,135. All of these patents show vehicle towing devices which are adapted to extend between the towing vehicle and the towed vehicle and to support the front end of the towed vehicle in an elevated position.

This invention has been developed especially for use in conjunction with recreational vehicles. An economy vehicle can be towed and backed as a trailer, attached or detached by one person without use of special tools or equipment in less than five minutes. The savings are substantial in fuel, consumption and wear and tear on the R.V. equipment through the use of the readily attachable and detachable towable economy vehicle.

While such towing devices of the prior art have been used, they do have disadvantages and shortcomings. In this regard, one finds that vehicle towing assemblies of the prior art have to some degree at least been expensive, complex and very difficult to handle. Besides being ungainful, another shortcoming of prior vehicle towing assemblies is that they are usually very massive and are quite difficult to store or transport when not being used.

SUMMARY OF THE PRESENT INVENTION

In view of the above disadvantages and shortcomings of vehicle towing assemblies, the present invention has been devised and presents a vehicle towing assembly that is designed such that it may be disassembled into gainful components and conveniently stored or transported when not being used. More particularly, the vehicle towing assembly of the present invention basically comprises an elongated tongue having a detachably mounted A-frame vehicle support structure secured to the rear portion thereof and projecting rearwardly therefrom and adapted to engage and support the front end of a towed vehicle. The rear portion of the tongue is provided with a self-aligning mechanism for properly aligning the tongue with the A-frame vehicle support structure such that the longitudinal axis of the tongue is generally aligned with the longitudinal axis of the A-frame vehicle support structure. In addition, the rear of the A-frame vehicle support structure is provided with a pair of laterally spaced apart elongated cylindrically shaped spikes (or mounting pins) that are adapted to be received by openings supported from the frame of the towed vehicle and wherein the A-frame vehicle support structure can be easily and conveniently aligned and positioned in proper lateral relationship with the towed vehicle by inserting the spikes within the openings.

To assure that the A-frame vehicle support structure firmly engages the towed vehicle, there is provided a front axle cradle structure disposed transversely across the A-frame vehicle support structure for receiving and supporting the front axle of the towed vehicle. Also, to assure that the towed vehicle is firmly connected to the A-frame support structure, there is provided a bumper connecting plate disposed generally transversely across the front portion of the A-frame structure and porjecting upwardly therefrom where the plate is designed and adapted to bolt directly to the front bumper of the towed vehicle.

It is, therefore, an object of the present invention to provide a vehicle towing assembly that is capable of being broken down into at least two major components or sub-assemblies for convenient transport or storage.

A further object of the present invention resides in the provision of a vehicle towing assembly with a component break-down feature, and wherein there is provided self-aligning means for aligning the respective longitudinal axis of the respective components or sub-assemblies of the vehicle towing assembly.

More particularly, an object of the present invention is to provide a vehicle towing assembly comprising two principal components or sub-assemblies, said components or sub-assemblies including an elongated tongue and an A-frame vehicle support structure adapted to be detachably mounted to the rear end portion of the tongue and to project therefrom for engagement with the front end of a towed vehicle, the A-frame vehicle support structure being adapted to support the front end of the towed vehicle in an elevated position such that only the rear wheels of the towed vehicle engage the ground or particular surface being traversed while towing.

Still a further object of the present invention is to provide a vehicle towing assembly of the type referred to above wherein the A-frame vehicle support structure is provided with means for aligning the same herewith such that the longitudinal axis of the A-frame vehicle support structure aligns with the longitudinal axis of the towed vehicle.

Another object of the present invention resides in the provision of a vehicle towing assembly having an A-frame vehicle support structure adapted to: (1) self-align with the longitudinal axis of the towed vehicle; (2) engage and directly support the front axle of the towed vehicle in an elevated position, and (3) directly attached to the front bumper of the towed vehicle.

A further object of the present invention is to provide a vehicle towing assembly that is relatively simple, easy to construct and manufacture, and which is relatively inexpensive.

Other objects and advantages of the present invention will become apparent from a study of the following description and the accompanying drawings which are merely illustrative of the present invention.

DESCRIPTION OF THE PREFERRED EMBODIMENT

Figure 1:
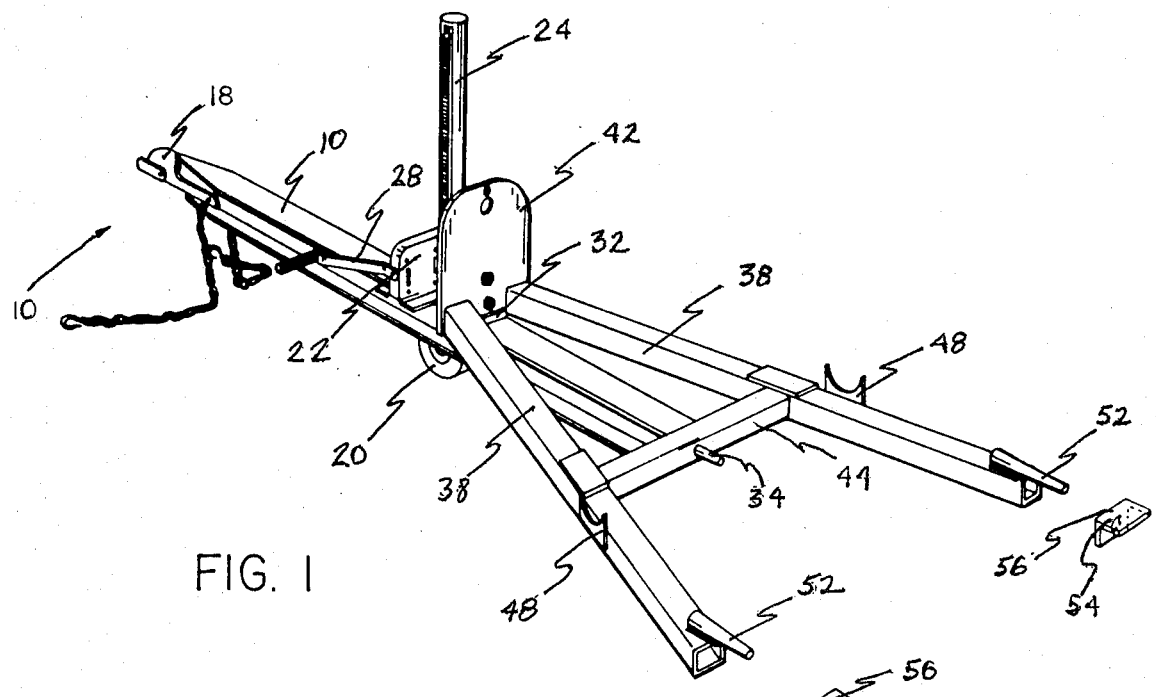
FIG. 1 is a perspective view of the vehicle towing assembly of the present invention.
Figure 2:
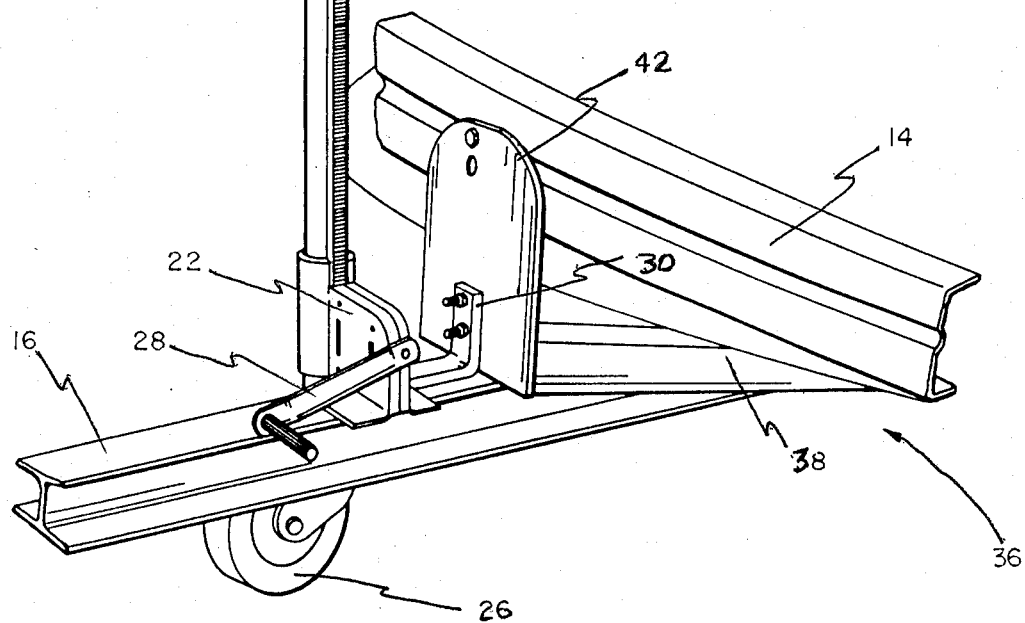
FIG. 2 is a fragmentary perspective view of a portion of the vehicle towing assembly of the present invention secured underneath the towed vehicle and bolted to the front bumper thereof.
Figure 3:
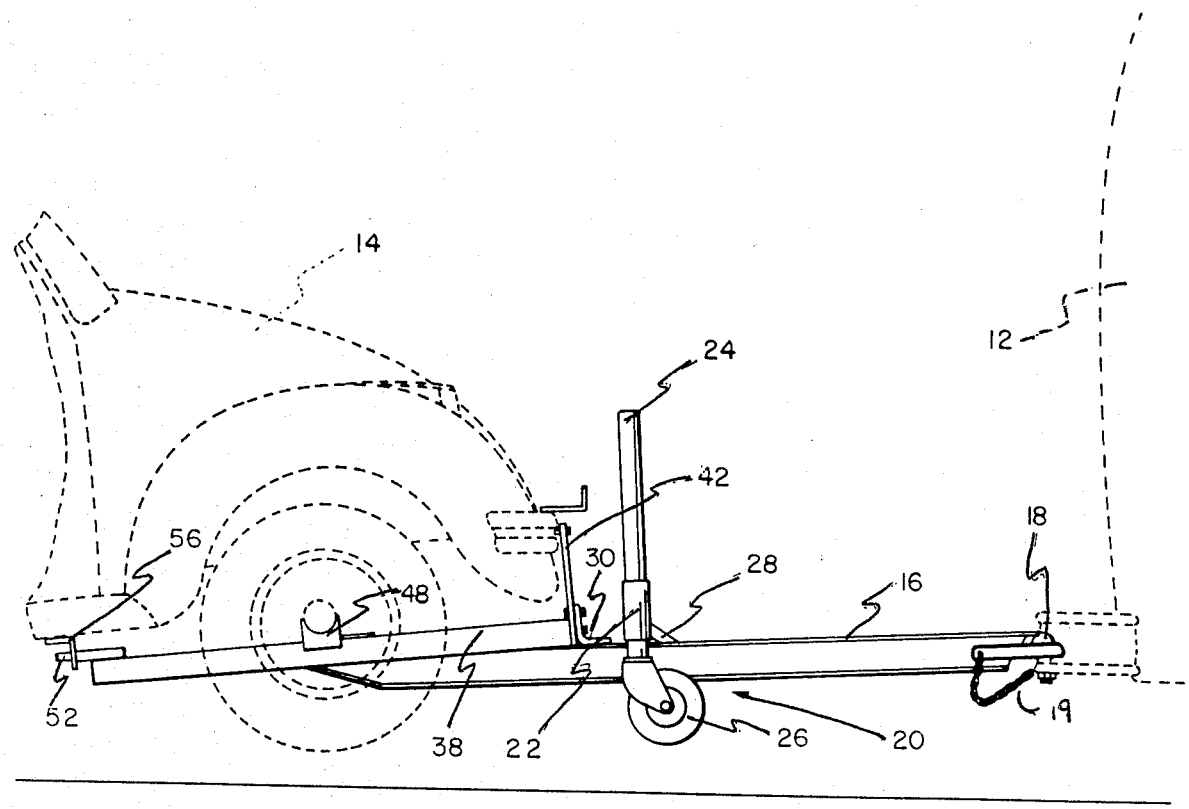
FIG. 3 is a side elevational view of the vehicle towing assembly interconnected between two vehicles.

With further reference to the drawings, particularly FIGS. 1 and 3, the vehicle towing assembly of the present invention is shown therein and indicated generally by the numeral 10. Vehicle towing assembly 10 is particularly adapted to be interconnected between two vehicles, one of the vehicles being referred to as a front or towing vehicle 12 while the other vehicle is referred to as a rear or towed vehicle 14.

Viewing the vehicle towing assembly 10 in greater detail, it is seen that the same comprises a separable tongue 16 having a conventional trailer hitch 18 secured to the front end thereof along with a pair of safety chains 19. Disposed intermediately on the tongue 16 is a wheel jack assembly indicated generally by the numeral 20. Wheel jack assembly 20 includes a mounting bracket 22 mounted on the tongue 16. Adjustably secured adjacent the bracket 22 is a vertically adjustable post 24 that includes a wheel 26 rotatively mounted to the lower end thereof, the vertically adjustable post 24 including a series of ratchet teeth disposed along one edge thereof and adapted to engage an internal jacking mechanism (not shown) which is actuated by the crank 25. Details of the internal jacking mechanism are not disclosed and discussed herein because such is not material to the present invention and the structure thereof is well known in the art. Thus, the actuation of the crank 28 results in the tongue 16 being vertically moved relative to the wheel 26.

Disposed rearwardly of the wheel jack assembly 20 is an L-shaped mounting bracket 30 which is fixed to the top surface of the tongue 16 and extends vertically therefrom. Spaced closely behind the L-shaped mounting bracket 30 is a stop 32 which is also fixed to the top surface of the tongue 16, such that a space is defined between the bracket 30 and stop 32.

Fixed to the rear of the tongue 16 and projecting rearwardly therefrom is an aligning pin 34, the aligning pin being generally elongated and cylindrically shaped and in the form of a spike. It should be pointed out that the aligning pin is generally disposed in parallel relationship with the tongue and its longitudinal axis.

Detachably mounted to the rear end portion of the tongue 16 is an A-frame vehicle support structure indicated generally by the numeral 36 and particularly illustrated in FIG. 1. The A-frame vehicle support structure 36 includes a pair of rearwardly projecting legs 38 and 40 and a bumper plate 42 fixed between the front terminal ends of the legs 38 and 40 such that the front terminal ends are disposed in lateral spaced apart relationship.

About the rear terminal ends of the legs 38 and 40, there is provided a pair of elongated mounting pins or spikes 50 and 52. Each spike 50, 52 is fixed about the rear terminal end of a respective leg 38, 40 and projects therefrom in generally parallel relationship with the longitudinal axis 49 of the A-frame vehicle support structure.

Each spike 50, 52 is adapted to be received and inserted through an opening 54 formed within or fixed to a bracket 56 adapted to be properly mounted to the underside or frame of the towed vehicle 14.

Extending transversely between intermediate portions of the legs 38 and 40 is a cross member 44 which includes a central opening for receiving the aligning pin 34 secured to the rear end of the tongue 16. Also, the A-frame vehicle support structure 36 is provided with cradle means for receiving the front axle of the towed vehicle 14. In this respect, it is seen that there is provided on legs 38, 40 in transverse alignment U-shaped cradle plates 46 and 48 for receiving and supporting the axle of the towed vehicle.

Figure 4:
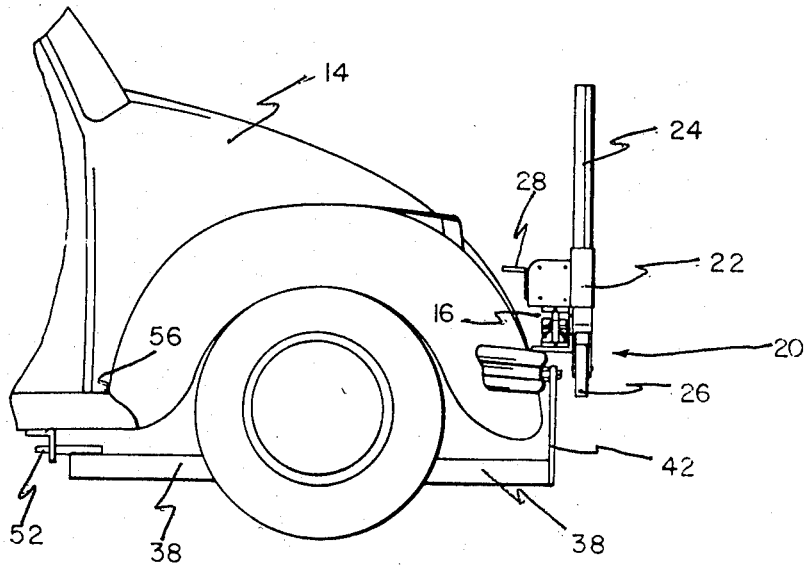
FIG. 4 is a side elevational view illustrating the tongue of the towing assembly disconnected and positioned for transport on the front bumper of the towed vehicle while the A-frame support structure remains connected to the towed vehicle.

In operation, the tongue 16 and A-frame vehicle support structure 36 may be separated for convenient transport (FIG. 4) or storage. To connect the tongue 16 to the A-frame vehicle support structure 36, the aligning pin 34 disposed on the tongue 16 is inserted through a central opening formed within the cross member 44 of the A-frame vehicle support structure 36. Once the pin 34 has been properly inserted, the space defined between the bracket 30 and the stop 32 generally aligns with the plane of the bumper plate 42 such that the bumper plate is received within this space. The bumper plate 42 is provided with a series of vertically spaced bolt openings that enable the bracket 30 to be bolted to the bumper plate 42 such that the longitudinal axis 49 of the A-frame vehicle support structure 36 aligns with the longitudinal axis of the tongue 16.

After the A-frame support structure 36 has been properly aligned and connected to the tongue 16, the vehicle towing assembly 10 is positioned underneath the front end of the towed vehicle 14 for connection therewith. (This, of course, assumes that the A-frame structure 36 was not already connected to the towed vehicle.) First, the pins or spikes 50, 52 secured to the rear terminal ends of the legs 38, 40 are aligned with the openings 54 positioned beneath the frame or underside of the towed vehicle 14. Once alignment has taken place, the vehicle towing assembly 10 is pushed rearwardly until the pins or spikes 50, 52 protrude through the openings 54 and the front axle of the towed vehicle 14 overlies each of the U-shaped cradle plates 46 and 48. After this has been accomplished, the adjustable jack 20 is actuated such that the tongue 16 is elevated relative to the wheel 26 such that the front end of the towed vehicle 14 is elevated above the ground or resting surface. Once the front end of the vehicle has been elevated a predetermined distance above the resting surface and the front portion of the tongue 16 is disposed above the level of the receiving trailer hitch of the towing vehicle 12, the towing vehicle is backed into proper position and the adjustable jack 20 is actuated so as to lower the hitch 18 downwardly onto the receiving hitch of the towing vehicle 12 wherein the standard hitch is properly connected thereto.

After the tongue 16 has been properly connected to the towing vehicle 12, then the adjustable jack 20 can be actuated to raise the post 24 and wheel 26 off the resting surface and closely adjacent the lower side of the tongue 16. At this point, the front end of the towed vehicle 14, as viewed in FIG. 3, is supported in cantilever fashion by the vehicle towing assembly 10 extending rearwardly from the towing vehicle 12. As supported, it is seen that the towed vehicle 14 can then be pulled by the towing vehicle with only the rear wheels (not shown) of the towed vehicle engaging the ground or pavement being traversed. This allows the front wheels to remain in an elevated position and the towed vehicle 14 to be towed in the same manner as towing a two-wheel vehicle, thereby avoiding the problems in steering, backing, and excessive tire wear that is normally encountered when towing a vehicle in which all four wheels engage the ground or pavement being traversed.

To disconnect the vehicle towing assembly 10 from the two vehicles 12 and 14, the method described above is simply reversed and consequently a detailed discussion thereof would tend to be repetitious. However, it should be emphasized that once the entire vehicle towing assembly 10 has been disconnected from the vehicles, that the tongue 16 may be disconnected from the A-frame structure 36 to provide for convenient transport or storage.

From the foregoing specification, it is seen that the vehicle towing assembly of the present invention presents a relatively simple, inexpensive and durable towing assembly for interconnecting two vehicles in a close interconnected relationship. In addition, the present vehicle towing assembly completely elevates the front two wheels of the towed vehicle during the towing operation so as to avoid the common ordinary problems encountered with tow bar assemblies that simply tow vehicles with all four wheels engaging the ground or pavement. Moreover, the present vehicle towing assembly may be broken-down into two major sub-assemblies which facilitate transport or storage and enables the entire vehicle towing assembly to be handled more easily.

The terms "upper", "lower", "forward", "rearward", etc., have been used herein merely for the convenience of the foregoing specification and in the appended Claims to describe the vehicle towing assembly and its parts as oriented in the drawings. It is to be understood, however, that these terms are in no way limiting to the invention since the vehicle towing assembly may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A vehicle towing assembly for interconnecting two vehicles one behind the other, said vehicle towing assembly comprising:
   a. an elongated tongue adapted to attach to a front towing vehicle;
   b. an A-frame vehicle support structure extending rearwardly from said tongue for engaging a rear towed vehicle and supporting the same while being towed by the front towing vehicle;
   c. said A-frame vehicle support structure including a pair of rearwardly projecting legs having rear terminal ends that terminate in lateral spaced apart relationship relatively to each other;
   d. a mounting pin fixed about the rear terminal end of each leg and projecting therefrom such that when said vehicle towing assembly is interconnected between vehicles each of said mounting pins project through an opening associated with a pin receiving structure fixed to the frame of the towed vehicle about the underside thereof;
   e. cradle means disposed on said A-frame vehicle support structure and generally U-shaped for receiving the front axle of the towed vehicle; and
   f. means for detachably securing said A-frame vehicle support structure to said tongue such that said tongue may be separated from said A-frame vehicle support structure for convenient transport or storage.

2. The vehicle towing assembly of claim 1 further including bumper interconnecting means disposed intermediately between the front of said tongue and the rear terminal ends of said legs for interconnecting said vehicle towing assembly with a front bumper of the towed vehicle.

3. A vehicle towing assembly of claim 2 wherein said bumper interconnecting means comprises a plate fixed approximately about the front portion of said A-frame vehicle support structure and extending vertically therefrom and including a bolt opening formed therein and adapted to receive a bolt which normally extends through the front bumper of the towed vehicle when the vehicle towing assembly is interconnected between the two vehicles.

4. The vehicle towing assembly of claim 3 wherein said mounting pins are slender elongated spikes and wherein a single spike is fixed to the rear terminal end of each leg of said A-frame vehicle support structure and extends therefrom with the axis of each elongated spike extending in general parallel relationship with the axis of said tongue; and wherein the pin receiving structure having the opening for receiving said mounting pins comprise a pair of support brackets normally fixed to the frame of the towed vehicle and depending downwardly therefrom and each including and O-ring fixed thereto for receiving a respective elongated spike.

5. The vehicle towing assembly of claim 4 wherein said A-frame vehicle support structure includes a transverse cross member extending between the two legs thereof generally midway the length of the A-frame vehicle support structure.

6. The vehicle towing assembly of claim 5 further including a wheel jack assembly fixed to said tongue intermediately between the front of said tongue and the area where said A-frame vehicle support structure joins said tongue.

7. The vehicle towing assembly of claim 6 wherein said cradle means for receiving and supporting the front axle of said towed vehicle comprises a pair of transversely aligned, laterally spaced U-shaped axle receiving brackets, each U-shaped axle receiving bracket being fixed to a respective leg of said A-frame vehicle support structure and in transverse alignment with the other U-shaped axle receiving bracket.

8. The vehicle towing assembly of claim 7 wherein the front portions of said legs of said A-frame vehicle support structure are laterally spaced apart and are joined by said bumper interconnecting plate, and wherein said tongue projects rearwardly past said bumper interconnecting plate and includes means fixed to the rear end thereof for cooperation with said cross member extending between the legs of said A-frame vehicle support structure to assist in aligning said tongue with said A-frame support structure.

9. The vehicle towing assembly of claim 1 wherein said A-frame vehicle support structure includes a cross member extending perpendicularly the longitudinal axis of said A-frame support structure and fixed to each of said legs; and wherein said means for detachably securing said tongue to said A-frame vehicle support structure includes an elongated pin fixed to the rear end of said tongue and adapted to project through an opening formed within said cross member; and wherein said detachable securing means further includes securing means fixed intermediately on said tongue for attaching to the front central area of said A-frame vehicle support structure.

10. The vehicle towing assembly of claim 9 wherein said means for securing said tongue to the front central area of said A-frame vehicle support assembly comprises a front bracket fixed to the top of said tongue and having bolt openings therein for receiving at least one bolt extending through a plate secured to the front ends of said legs, and a stop fixed to the top of said tongue and spaced rearwardly of said bracket so as to define a space therebetween for receiving said plate.

* * * * *